US005544126A

United States Patent [19]
Berryhill

[11] Patent Number: 5,544,126
[45] Date of Patent: Aug. 6, 1996

[54] SYSTEM AND METHOD OF SEISMIC SHOT-RECORD MIGRATION

[76] Inventor: John R. Berryhill, 403 Chaparral Rd., Austin, Tex. 78745

[21] Appl. No.: 147,025

[22] Filed: Nov. 4, 1993

[51] Int. Cl.$^6$ .............................. G01V 1/32; G01V 1/36
[52] U.S. Cl. .............................. 367/52; 367/63; 364/421
[58] Field of Search .............................. 367/21, 52, 53, 367/63; 364/421

[56] References Cited

U.S. PATENT DOCUMENTS

| 4,479,205 | 10/1984 | Gray | 367/63 |
| 4,742,497 | 5/1988 | Beasley et al. | 367/52 |
| 4,907,205 | 3/1990 | Yanchak | 367/52 |

OTHER PUBLICATIONS

Claerbout, J. F., "Imaging the Earth's Interior", Blackwell Scientific Publications, 377, 1985.
Al-Yahya, K., "Velocity Analysis by Iterative Profile Migration", Geophysics, 54, 718–729, 1989.
Versteeg, R. J., "Sensitivity of Prestack Depth Migration to the Velocity Model", Geophysics, 58, 873–879, 1993.
Berryhill, J. R., "Kinematics of Crossline Prestack Migration", Geophysics, 56, 1674–1676, 1991.
Berryhill, J. R., "Wave-equation Datuming Before Stack", Geophysics, 49, 2064–2066, 1984.
Berryhill, J. R., "Submarine Canyons: Velocity Replacement by Wave-equation Datuming Before Stack", Geophysics, 51, 1572–1579, 1986.
Berryhill, J. R. and Kim, Y. C., "Deep-water Peg Legs and Multiples: Emulation and Suppression", Geophysics, 51, 2177–2184, 1986.
Chen, K. H., "Reverse-time Profile Migration", 57th Ann. Internat. Mtg., Soc. Expl. Geophys., Expanded Abstracts, 758–760, 1987.
Biondi, B. and Ronen, S., "Shot Profile Dip Moveout Using Log-stretch Transform", 56th Ann. Internat. Mtg., Soc. Expl. Geophys., Expanded Abstracts, 431–434, 1986.

Lafond, C. F. and Lavander, A. R., "Migration Moveout Analysis and Depth Focusing", Geophysics, 58, 91–100, 1993.
Schultz, P. S. and Sherwood, J. W. C., "Depth Migration Before Stack", Geophysics, 45, 376–393, 1980.
Wapenaar, C. P. A. and Berkhout, A. J., "Full Prestack Versus Shot Record Migration", 57th Ann. Internat. Mtg., Soc. Expl. Geophys., Expanded Abstracts, 761–764, 1987.
Benson, A. K., "An Explicit, Unconditionally Stable, 15-degree Depth Migration and Modeling Algorithm Implemented in Poststack, Directional, and Prestack Modes", Geophysics, 56, 1412–1422, 1991.
Denelle, E., Dezerd, Y. and Raoult, J., "Implementation of a 2-D Prestack Depth Migration Scheme on a Cray–1S", 55th Ann. Internat. Mtg., Soc. Expl. Geophys., Expanded Abstracts, 318–320, 1985.
Loewenthal, D. and Hu, L. Z., "Two Methods for Computing the Imaging Condition for Common–shot Prestack Migration", Geophysics, 56, 378–381, 1991.
Pan, N. and French, W. S., "Generalized Two-pass Three-dimensional Migration for Imaging Steep Dips in Vertically Inhomogeneous Media", Geophysics, 54, 544–554, 1989.
Wiggins, J. W., "Kirchhoff Integral Extrapolation and Migration of Nonplanar Data", Geophysics, 49, 1239–1248, 1984.

(List continued on next page.)

*Primary Examiner*—Nelson Moskowitz
*Attorney, Agent, or Firm*—Jenkens & Gilchrist, P.C.

[57] ABSTRACT

A method of seismic shot-record migration includes the steps of generating seismic or acoustic waves into an earth formation from one or more sources with the sources being spaced some finite distance from each other. Next, one or more spaced receivers receive a seismic signal after the signal reflects or diffracts off of a subterranean feature. Next, a source location and a receiver location is arbitrarily selected. Finally, input data is mapped or migrated according to one of two equations, or both equations, to produce output data. The output data is then suitable for further processing by other seismic analysis techniques.

16 Claims, 9 Drawing Sheets

OTHER PUBLICATIONS

Hearn, T. M., "Time–Domain Application of Dip Moveout to Shot Gathers", 59th Ann. Internat. Mtg., Soc. Expl. Geophys., Expanded Abstracts, 1140–1143, 1989.

Waters, "Reflection Seismology", John Wiley and Sons, Publishers, 1981, & N 269. W 37, pp. 188–195.

Yilmaz, O ; Seismic Data Processing ISBN 0-931830-46-X, 1987, pp. 328–345.

Coffeen, S. A.; Exploration Fundementals, ISBN 0-87814-29J-9, 1986, pp. 118–217.

Claerfaut, S. F.; Fundamentals of Geophysical Data Processing, ISBN 0-86542-305-9, 1985, pp. 227–263.

SYSTEM AND METHOD OF SEISMIC SHOT-RECORD MIGRATION

BACKGROUND OF THE INVENTION

1. Field of the Invention

The present invention relates to prestack migration of seismic data. More particularly, the present invention relates to prestack migration of seismic data comprising an ensemble of seismic traces recorded in association with a single shot.

2. Description of the Related Art

Claerbout's imaging principle, that "reflectors exist in the earth at places where the onset of the downgoing wave is time-coincident with an upcoming wave," is the foundation of all extant methods of shot-record migration. Claerbout, J. F., *Imaging the Earth's Interior*, BLACKWELL SCIENTIFIC PUBLICATIONS, 377 (1985). Claerbout differentiates this idea from the "survey-sinking" idea that employs downward continuation of both common-source and common-receiver records; but other authors argue that the two approaches are equivalent. In any case, Claerbout's idea defines shot-record depth migration and seeks to produce a subsurface image directly from each shot record. In the recent literature, the term "shot-record migration" is synonymous with shot-record depth migration. The recent literature, however, does not recognize the possibility of shot-record migration without concurrent imaging. Extant methods do not produce shot records as outputs, but rather collections of zero-offset traces.

Researchers specializing in the field of geophysics express considerable confidence in the potential efficacy of their own methods. Many would endorse the claim of Al-Yahya that ". . . (the conventional processing stream) should be replaced by the more theoretically accurate prestack depth migration ...." Al-Yahya, K., *Velocity Analysis by Iterative Profile Migration*, GEOPHYSICS, 54, 718–729 (1989). At the same time, many authors frankly admit the practical problems encountered in applying their own approaches to routine data processing, and they describe the cost of the individual methods as an impediment. The chief difficulty reported in attempts to apply shot-record depth migration is that the content and quality of the images produced are extremely sensitive to the assumed velocity field. Closely related to the velocity sensitivity is that these solution methods produce results that preclude further processing by other standard techniques. For example, the prior art methods uniformly modify the echo pattern characteristic of a horizontal reflector during processing. Further, these existing methods can be implemented only by digital computers.

The impression created by authors referred to in the immediately preceding paragraph is that prestack depth migration requires or provides a criterion for defining a very detailed picture of subsurface velocities. However, one author (Versteeg, R. J., *Sensitivity of Prestack Depth Migration to the Velocity Model*, GEOPHYSICS, 58, 873–882 (1993)) presents evidence that if the exact velocity field is known, a rather low-resolution rendering of that field is sufficient to recover an acceptable image, even where there is small-scale velocity variation.

The question may be posed whether the apparent hypersensitivity of shot-record depth migration to velocity is an artifact of the method itself. It seems clear that obtaining a subsurface image directly from a shot record is not a straightforward task. A possible alternative to shot-record depth migration is shot-record time migration. An inference of the existence of shot-record time migration comes from the fact that shot-record DMO exists. For example, if DMO is considered as a zero-offset demigration (i.e., diffraction or modeling) of a prestack migration result, then zero-offset migration of a DMO shot record, followed by reverse NMO, should indicate what a time-migrated shot record looks like in contrast to depth migration, time migration seeks the comparatively modest goal of determining the lateral location of the origin of a seismic echo, while leaving the depth of the object undetermined. The application of other well-known methods for estimating depth may be employed as appropriate or required after use of time migration.

Based upon the foregoing, those skilled in the art should fully understand and appreciate that prior art depth-oriented methods for migrating seismic data share several drawbacks: they demand especially precise prior knowledge of subsurface seismic velocities; they produce results in a form that precludes additional desirable processing by many standard techniques; and they can be implemented only by digital computer. It is a shortcoming and deficiency of the prior art that the seismic exploration industry lacks a method of shot migration that allows the use of conventional velocity analysis, common-midpoint stacking, and other conventional procedures as post-processing techniques. It is also a shortcoming and deficiency of the prior art that the seismic exploration industry lacks a method of prestack migration of seismic data that can be performed by hand as well as by digital computer. Yet another shortcoming and deficiency of the prior art is the lack of a method of prestack migration-of seismic data wherein the echo pattern characteristic of a horizontal reflection, as observed in a seismic shot record, passes through the process without modification.

SUMMARY OF THE INVENTION

The present invention overcomes the shortcomings and deficiencies mentioned above by providing a method of shot-record migration wherein the first step is generating seismic or acoustic waves into an earth formation from one or more sources with the sources being spaced some finite distance from each other. Next, one or more spaced receivers receive a seismic signal after the signal reflects or defracts off of a subterranean feature. Next, a source location and a receiver location is arbitrarily selected. Finally, input data is mapped or migrated according to one of two equations, or both equations, to produce output data. The output data is then suitable for further processing by other seismic analysis techniques.

Accordingly, an object of the present invention is to determine the lateral location of the origin of a seismic echo.

A feature of the present invention is that the echo pattern characteristic of a horizontal reflector passes through processing without modification.

An advantage of the present invention is that further processing of migrated output data by conventional velocity analysis, common-midpoint stacking, or other conventional seismic analysis techniques is possible.

Another advantage of the present invention is its reduced sensitivity to variations in velocity of the seismic signals as compared to prior art techniques.

BRIEF DESCRIPTION OF THE DRAWINGS

Other objects, advantages, and novel features of the present invention will become apparent from the following detailed description of the invention when taken in conjunction with the accompanying drawings wherein.

DETAILED DESCRIPTION OF THE INVENTION

Consideration of the following example, which is purely exemplary, further clarifies the use of the present invention.

Figure 1:
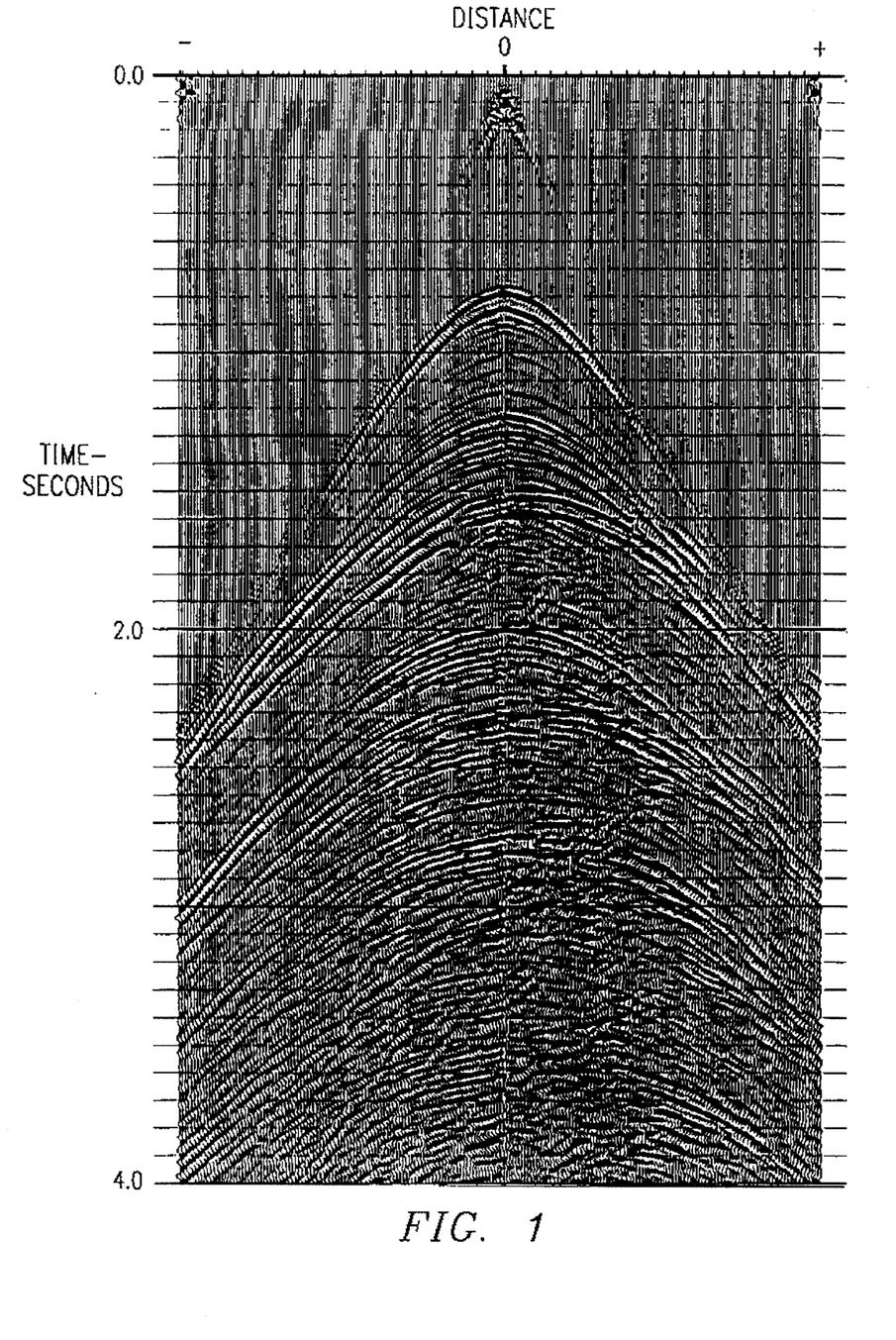
FIG. 1 is a sample of seismic data.

Seismic data are generally displayed in the form of a time coordinate versus a space coordinate. For shot records, the space coordinate represents the distance along a straight line from the position of the source of seismic energy (a shot) to the position of each receiver in plurality. The time coordinate indicates the time elapsed from activation of the shot to detection of motion at each receiver position. FIG. 1 shows an example display of seismic data where the space coordinate is the horizontal or x axis and the time coordinate is the vertical or t axis. Reflection seismology depends upon the fact that a subterranean object will reflect, refract, or diffract the source signal back to each receiver with each receiver generating (actually receiving) a signal that is unique to the receiver's position. When defining terminology, one may generally substitute "common-receiver," or "common-endpoint" for common-source or "common-shot". At the same time, the foregoing, essentially synonymous, ways of grouping seismic traces are distinct from "common-offset," "common-midpoint," and "zero-offset" (or "stacked") groupings.

A shot record, as recorded, gives no direct indication of the location of a subsurface object producing an echo. Recognizing this limitation, the industry uses the term migration to express the goal of constructing a representation of subsurface conditions vertically below a known position on the Earth's surface. The methods for common-source migration already known to the industry are termed "depth" migration methods because they seek to determine the depth (possibly expressed as vertical travel time) at which a subsurface echo originates along with the lateral position.

The present invention provides a method of accomplishing the general objective of shot-record migration, and it seeks the comparatively modest goal of determining the lateral location of the origin of a seismic echo, while leaving the depth undetermined. Estimating depth is available using other well-known methods as post-processors. In the context of migration of data in other than common-shot form, the industry observes a distinction between "depth" migration and "time" migration. It is consistent with industry prior usage to describe the purpose and method of the present invention as shot-record "time" migration.

Figure 2:
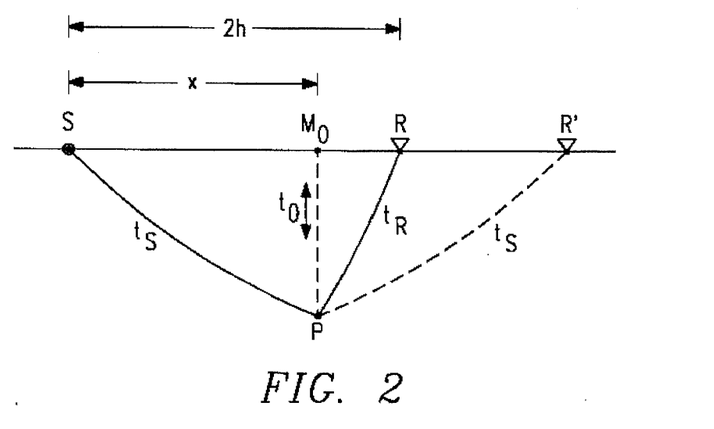
FIG. 2 shows seismic ray paths from a source to a receiver.

Referring again to the drawings, FIG. 2 indicates a shot at position S and a receiver at position R, connected with a seismic signal ray path from S to R by way of an undetermined object or point P located somewhere within the subsurface. In seismic exploration, practitioners measure the positions of S and R, together with the travel time t associated with the ray path SPR. Those practitioners do not know the position of P or the travel times $t_S$ and $t_R$ associated with the ray path segments SP and PR, respectively; but they do know that $t=t_s+t_R$. In the event that S and R do not reside at exactly the same elevation, well-known methods of static correction are applicable.

FIG. 2 discloses a distance x measured from S to a point on the Earth's surface vertically above the point P, and a receiver R' defined at distance 2x from S. By symmetry, the travel time for the postulated ray path SPR' is $t'=2t_s$. By construction, the point P lies vertically below the surface midpoint of the source receiver pair SR'. Other migration techniques define a midpoint $M_O$ that is a point on the Earth's surface vertically above the point P at a distance of x from the source S, with $t_O$ defined as the two-way travel time of a seismic signal between $M_O$ and P. For the purpose of this invention, S+x is the migrated position and t' is the migrated time corresponding to the signal detected at time t by receiver R. Since the distance from S to R is defined to be 2h, the position of the midpoint of the source receiver pair SR is S+h. This invention seeks to migrate data from (S+h,t) to (S+x,t'). Or, since S is common to input and output for common-shot analysis, this invention seeks a two-dimensional mapping of data from coordinates (h,t) to coordinates (x,t'). Shot-record time migration is a mapping from half-offset and input time to midpoint and two-way shot time. After $t_R$ is removed from t by downward continuation to a particular datum, t' is simply twice the remainder. It is not intended that receiver R' be considered to be real; however, it is intended that SPR' be recognized as manifestly a migrated ray path, and that ray paths reflected from horizontal interfaces are migrated to begin with. Previous definitions of shot-migration concur that S+x is the migrated position, but they postulate a migrated time t" that is either the sum of $t_S$ plus the vertical travel time $t_O/2$ from P to the surface, or simply the two-way vertical travel time $t_O$. According to such a definition, even for a horizontal reflector where $t_R=t_S$ result t" is different from t.

The step of removing or subtracting $t_R$ from t can be accomplished indirectly by downward continuation of a common-source record. The step of adding $t_S$ to ($t-t_R$) can be accomplished indirectly by upward continuation of a common-receiver record.

Figure 3:
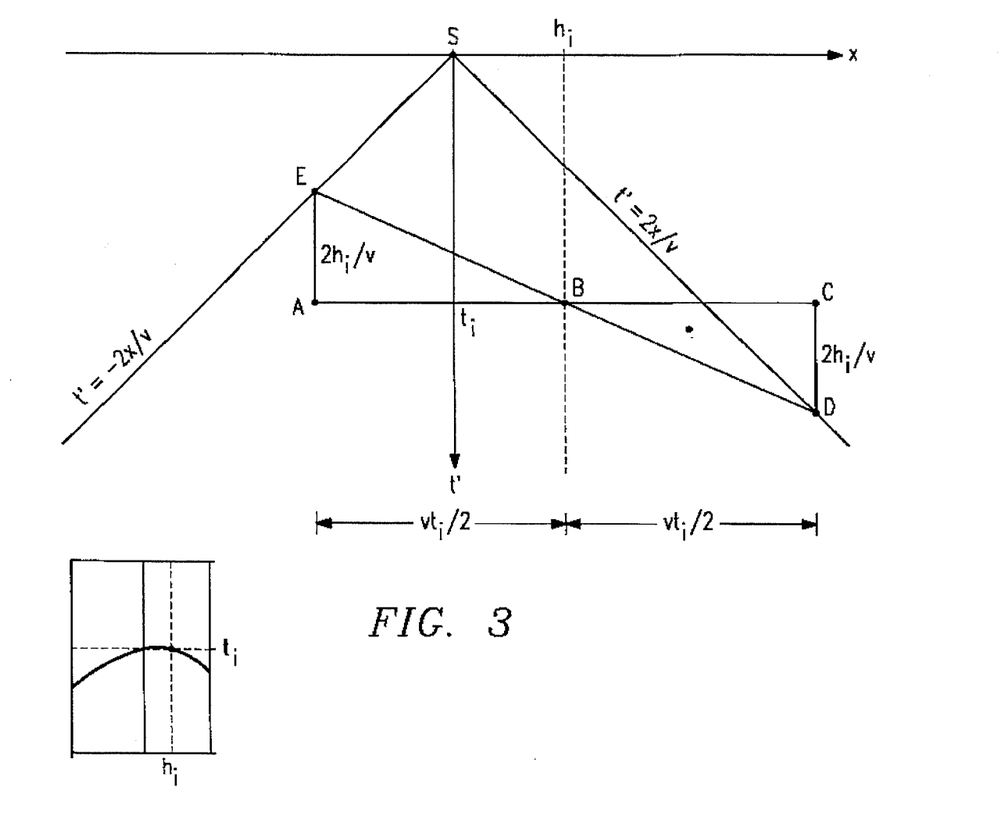
FIG. 3 shows geometrical steps for performing the present invention.

Assuming a constant velocity in calculating travel times for ray paths, the present invention can be implemented by graphical means employing a straight-edge and compass. FIG. 3 depicts an (x,t') coordinate system in which for convenience a unit of distance x is the same as a unit of time t' multiplied by half the assumed constant velocity v. With these assumptions, the following steps best illustrate the technique of shot-record time migration:

I. Define the object to be migrated: On the input-data shot record (see inset of FIG. 3), draw an interpretive curve and thereby define a set of points $(h_i,t_i)$, where subscript i runs from 1 to the number of seismic traces in the input record.

II. For each input point $(h_i,t_i)$, perform the following:
1. Plot point B at $x=h_i, t'=t_i$.
2. Draw the horizontal line BC of length $$\frac{vt_i}{2},$$

with C farther from the shot S than B.
3. Draw the horizontal line AB of length $$\frac{vt_i}{2},$$

with A closer to the shot than C.
4. Draw the vertical line CD of length $$\frac{2h_i}{v}$$

downward from C.
5. Draw the vertical line AE of length $$\frac{2h_i}{v}$$

upward from A.
6. Draw the line ED, which necessarily passes through B. ED is the desired result. As a check, points E and D lie on the straight line segments defined by the equation $$t' = \frac{2|x|}{v}.$$

Line ED defines the set of all points (x,t') that are physically consistent with $(h_i,t_i)$. Given just a single unmigrated data point $(h_i,t_i)$, all one can determine is that the corresponding migrated point (x,t') lies somewhere on the line ED. Line ED is therefore most appropriately defined as the "migration locus" of input point $(h_i,t_i)$.

After repeating steps 1 through 6 for enough input points, the envelope of all the migration loci determines the set of migrated points corresponding to the set of selected input points. If one selects the input points $(h_i,t_i)$ from a curve generated by a seismic signal diffractor rather than a seismic signal reflector, the envelope of the migration loci then becomes a single point, at which all the straight lines intersect. As a check, if one selects the input points $(h_i,t_i)$ from the curve or hyperbola that corresponds to a flat reflector, then each migration locus is tangent to that curve. The envelope of a set of tangents to a curve reproduces the curve.

Using the geometrical representation of FIG. 3, one can easily define shot-record time migration in the following manner. First one acquires a common-shot set of seismic signal traces by generating acoustic waves into an earth formation from one or more sources. One or more receivers receive the seismic signals as a digitally sampled function of time t at a particular distance 2h from any selected source to form the seismic trace data records. One next defines a common-shot set of output traces initially filled with zeroes (i.e., no signal) with each set of output traces representing a function of time t' at a particular distance 2x from the source to a hypothetical receiver R'. One can then migrate or map each permissible input sample (h,t) for $$t > \frac{2|h|}{v},$$

to all possible output samples (x,t') for $$|x - h| < \frac{vt}{2},$$

using the relationship:

$$t' = t + \frac{\left(\frac{2h}{v}\right)(x-h)}{\left(\frac{vt}{2}\right)} \quad (1)$$

Or, equivalently, one can map all possible input samples (h,t) for $$|x - h| < \frac{vt}{2},$$

to each permissible output sample (x,t') for $$t' > \frac{2|x|}{v},$$

using the relationship:

$$t = \frac{t' + \sqrt{t'^2 - \frac{16h(x-h)}{v^2}}}{2} \quad (2)$$

The verb "map to" is used here to mean to add accumulatively to an output sample a quantity proportional to an input sample, possibly multiplied by an independent factor. The purpose of such an independent factor might be to improve the appearance of the ultimate result. For example, if a value of t' calculated from equation (1) falls between two discrete output time samples, or if a value of t calculated from equation (2) falls between two discrete input time samples, one can employ an appropriate interpolation as necessary. The algebraic signs of x, h, and (x−h) are significant and generally take both positive and negative values. The set of discrete x values need not be the same as the set of discrete h values. The velocity term v appearing in equation (1) can be a constant, a function of t, or a function of both t and h. The velocity term v appearing in equation (2) can be a constant, a function of t', or a function of both t' and x.

Figure 4:
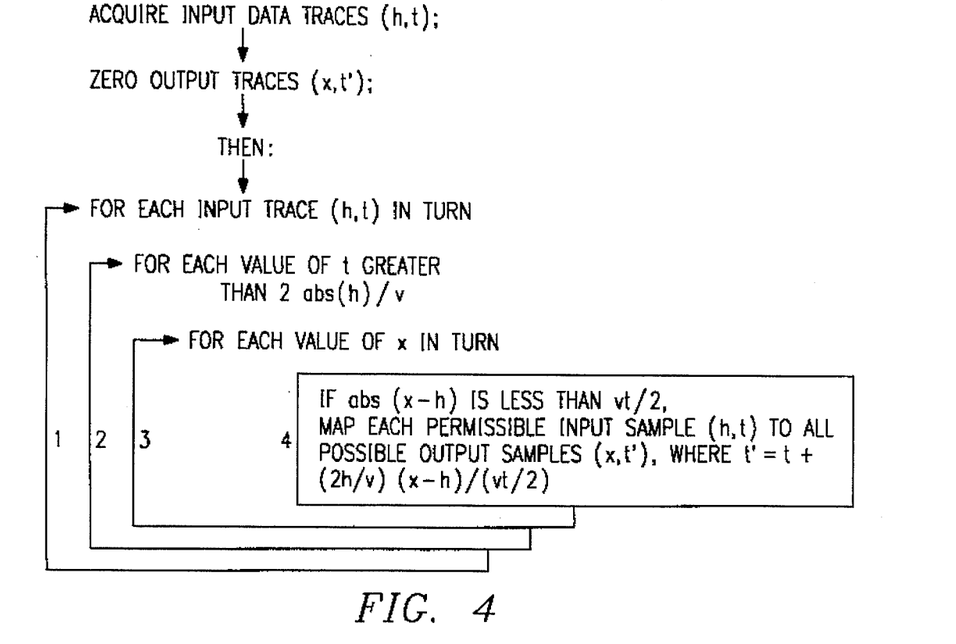
FIG. 4 is a flowchart of the invention using a first equation.

Turning to FIG. 4, there is shown a flow chart of the present invention employing equation (1). Embedded within three nested process loops 1, 2, and 3 is the mapping step 4. This structure ensures that the mapping step 4 processes all required values of h, t, and x. Other orderings of the loops will produce substantially the same result. For example, loop 3 for all x values could be the outermost loop. From the standpoint of efficiency in many applications, FIG. 4 depicts the preferred embodiment of equation (1).

Figure 5:
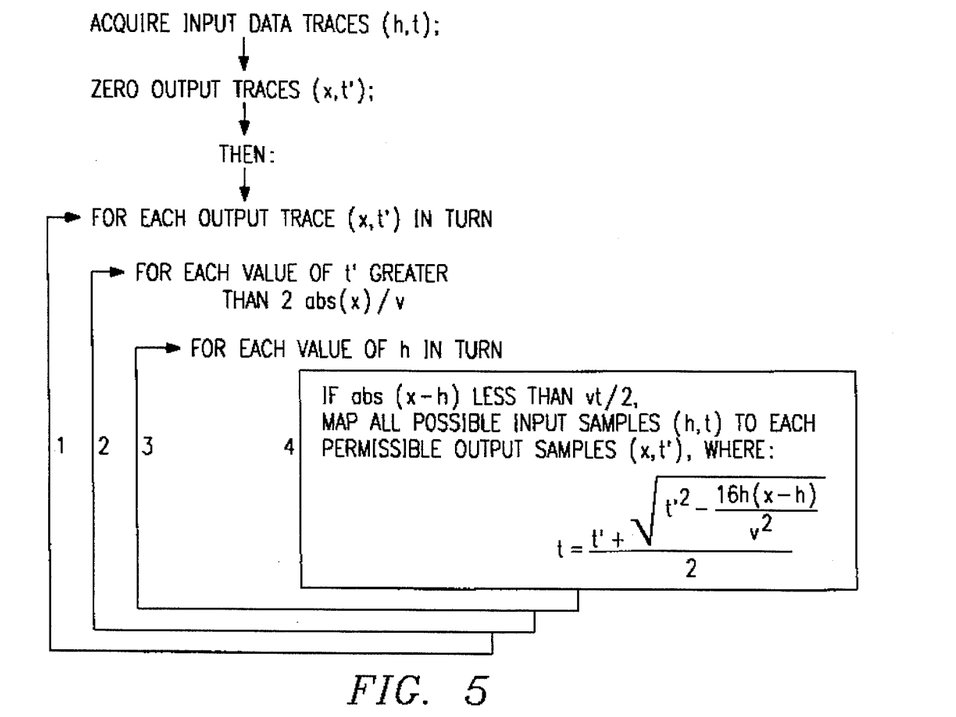
FIG. 5 is a flowchart of the invention using a second equation.

FIG. 5 shows a flow chart of the present invention employing equation (2). Embedded within three nested process loops 1, 2, and 3 is the mapping step 4. This structure ensures that the mapping step 4 processes all required values of x, t', and h. Other orderings of the loops will produce substantially the same result. For example, loop 3 for all h values could be the outermost loop. From the standpoint of efficiency in many applications, FIG. 5 depicts the preferred embodiment of equation (2).

Equation (1) expresses algebraically the same relationship between input and output as line ED in FIG. 3. The term "impulse response," in the context of seismic migration, is applicable to the definite relationship between input and output that a process produces. In this context, the present invention is a method for migrating shot records whose impulse response, for constant velocity, is a straight line.

Equation (2) as used in FIG. 5 instructs the computer to collect from the input all samples (h,t) that physically could have been caused by a point scatterer at output location (x, t'). Still, the effect of the method depicted in FIG. 5 upon any one point (h,t) in the input is to distribute the output along the line defined by equation (1).

The previous discussion of the invention is in terms of 2-D seismic data. This invention is also relevant to the processing of 3-D seismic data. In FIG. 2, the points S, R, and P need only be coplanar; the plane that these points determine need not be perpendicular to the surface of the Earth. The present inventor has previously shown how one can reform 3-D data to achieve the effect of 2-D data confined to vertical planes. Berryhill, J. R., *Kinematics of Crossline Prestack Migration*, GEOPHYSICS, 56, 1674–1676 (1991) (incorporated herein by reference). One can apply the Berryhill "reformation" method before or after the method of the present invention. For example, one can rotate the plane in FIG. 2 determined by S, R, and P about the axis SR to account for the third spatial dimension. Correspondingly, one can rotate the plane in FIG. 3 defined by the x and t' axes about the x axis. Line ED would thus generate a surface recognizable as a truncated cone. The impulse response of the invention when applied to 3-D seismic data, therefore, is half the surface of a truncated cone whose axis passes through S and R.

FIGS. 6A through 12 exemplify the implementation of the present invention for graphical data. For these figures, a constant velocity value of 2813 m/s was assumed. The point marked "0" halfway across the upper edge of each illustration indicates the location of the seismic source S. Starting at S, one measures distances with the corresponding receiver locations negative leftward and positive rightward. Time and depth values increase downward starting from zero at the top edge of each illustration.

Figure 6A:
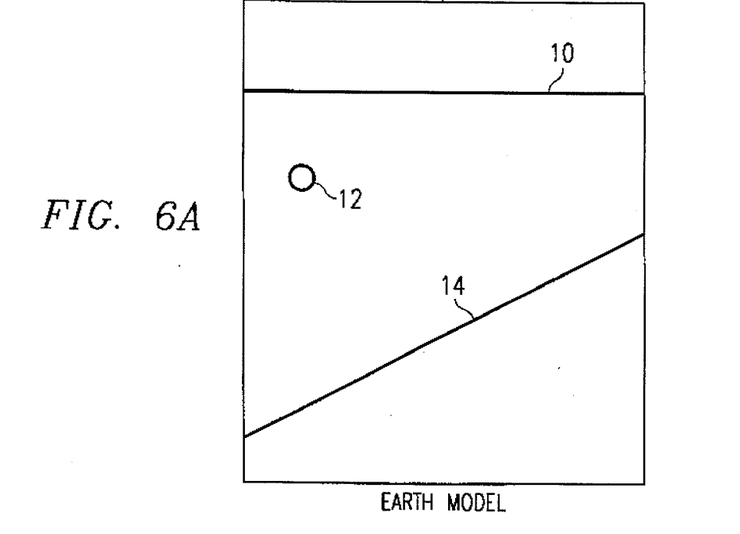
FIG. 6A is an Earth model of subterranean features.
Figure 6B:
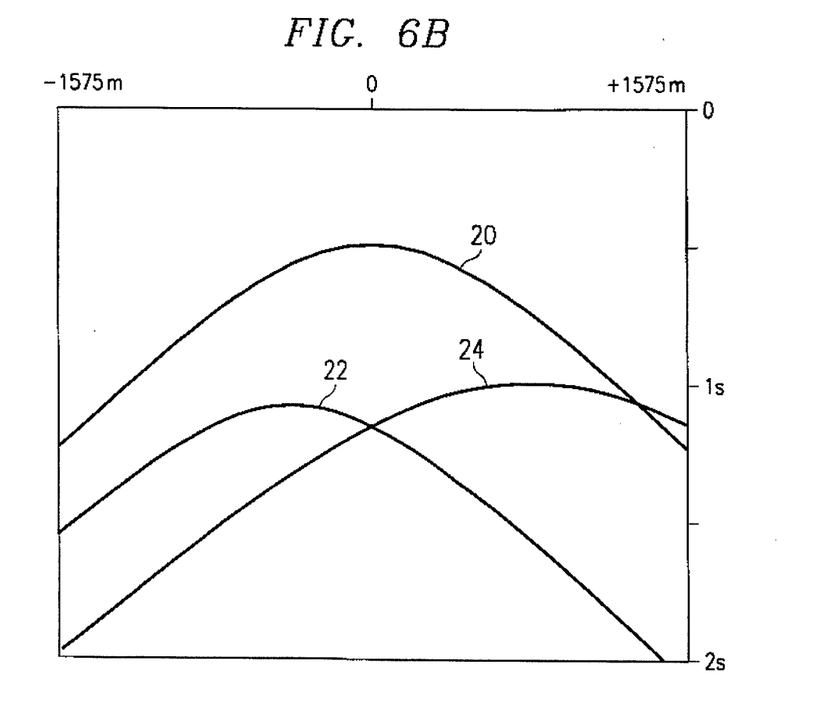
FIG. 6B depicts three seismic shot curves as samples for the Earth model of FIG. 6A.

FIG. 6A shows a hypothetical model of subterranean features used to illustrate the operation of the present invention. FIG. 6B depicts three seismic data curves such as we might select from a seismic shot record of the Earth model of FIG. 6A. The uppermost curve 20 of FIG. 6B corresponds to the horizontal reflector 10 of FIG. 6A at a depth of 703 m. The leftmost curve 22 of FIG. 6B corresponds to the point scatterer or diffractor 12 of FIG. 6A at a depth of 1406 m and displaced a distance 812 m leftward of the shot. The rightmost curve 24 of FIG. 6B corresponds to the dipping plane 14 of FIG. 6A that inclines upward to the right at an angle of 30 degrees to the horizontal. FIG. 6B additionally shows that the curve for the dipping plane 24 and the curve for the diffractor 22 intersect at lateral position 0.

Figure 7:
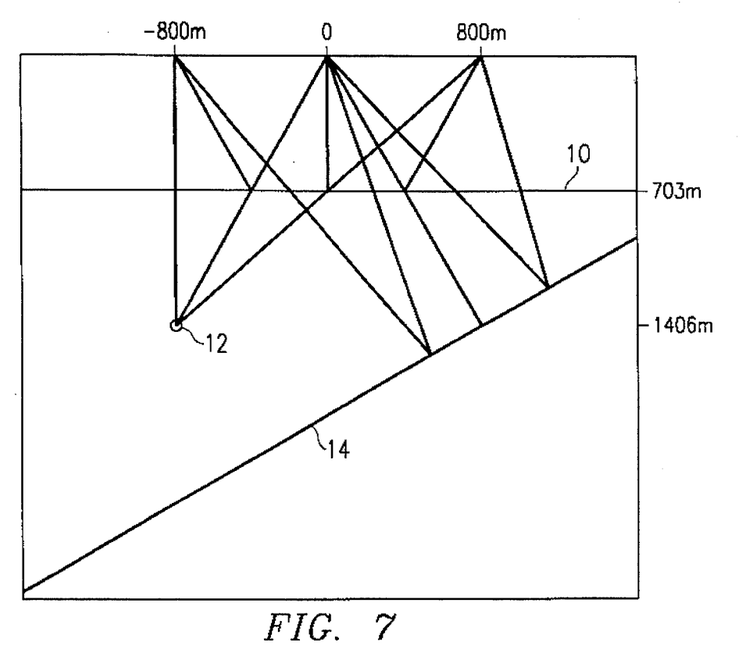
FIG. 7 illustrates the subsurface geometry for the three sample curves.

FIG. 7 displays the associated seismic ray paths for representative source receiver distances of 0, −800 m, and +800 m. As a reminder, one plots the time signal corresponding to any particular SR pair at the SR midpoint, which is haft the distance of R from S. A seismic ray that reflects directly back to the shot encounters dipping plane 14 at a depth of 1406 m.

Figure 8:
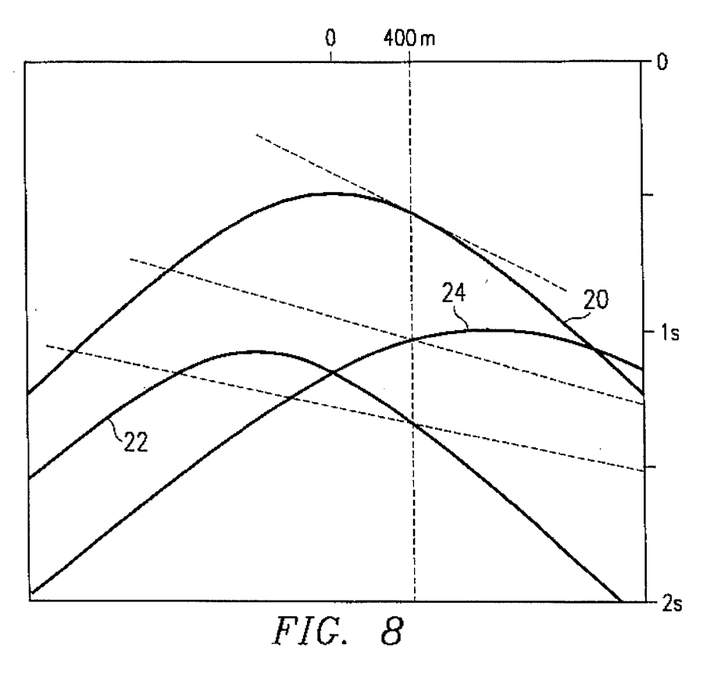
FIG. 8 illustrates a migration locus for the sample curves.

FIG. 8 illustrates the migration locus for the curves of FIG. 6B, for one value of SR midpoint h, constructed according to the method defined in FIG. 3. The vertical dotted line defines the position h=400 m. Each of the three slanted dotted lines is a particular instance of the line designated ED in FIG. 3, but here drawn according to the parameters appropriate to this example. Only for the horizontal reflector curve 20 is the migration locus tangent to the curve.

Figure 9:
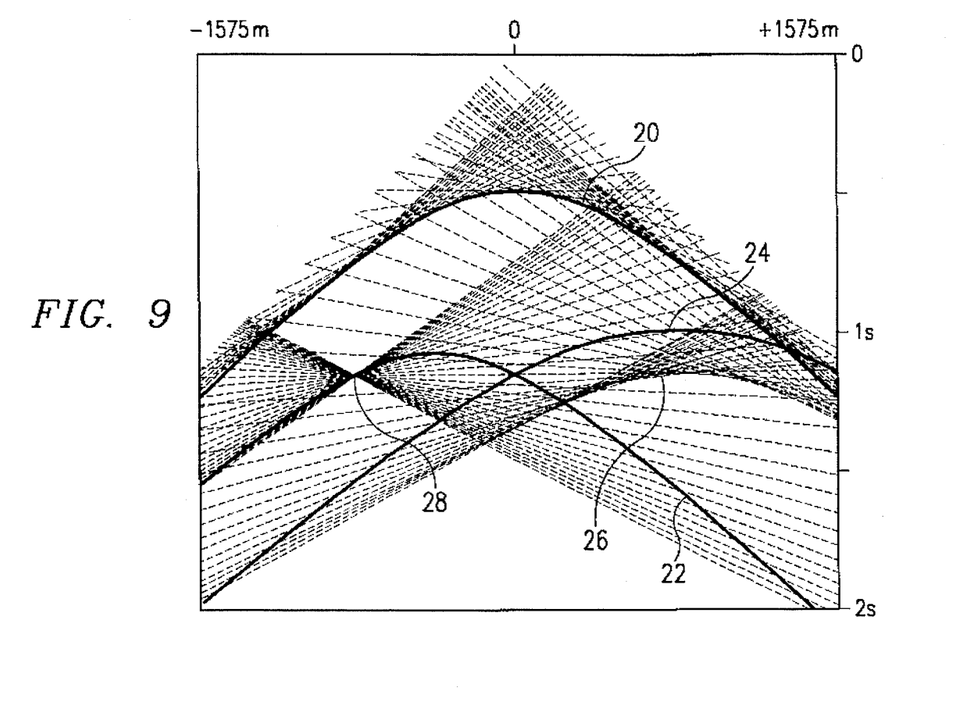
FIG. 9 shows the results of constructing migration loci for the sample curves.

FIG. 9 shows the result of constructing the migration loci for the given input curves, each at 31 different positions of h. According to the teachings of the present invention, the migrated result corresponding to each input curve is visible as the envelope of its migration loci. It may be observed that:
1. For the horizontal plane 10 of FIG. 6A, the envelope of the migration loci coincides with the input curve 20. The curve corresponding to the horizontal plane is unchanged by the invention.
2. For the dipping plane 14 of FIG. 6A, the envelope of the migration loci is a curve 26 resembling the input curve 24, but displaced later in time. The apex of the output curve 26 remains at the same lateral location, but the minimum time at the apex changes to coincide with the value observed at h=0 on the input curve 24.
3. For the diffractor 12 of FIG. 6A, the envelope of the migration loci is a single point 28 at which all these lines intersect. The lateral location of this point coincides with the true location of the scatterer as depicted in FIG. 6A. The time value resulting for this point coincides with that observed at h=0 on the input curve 22.

Figure 10:
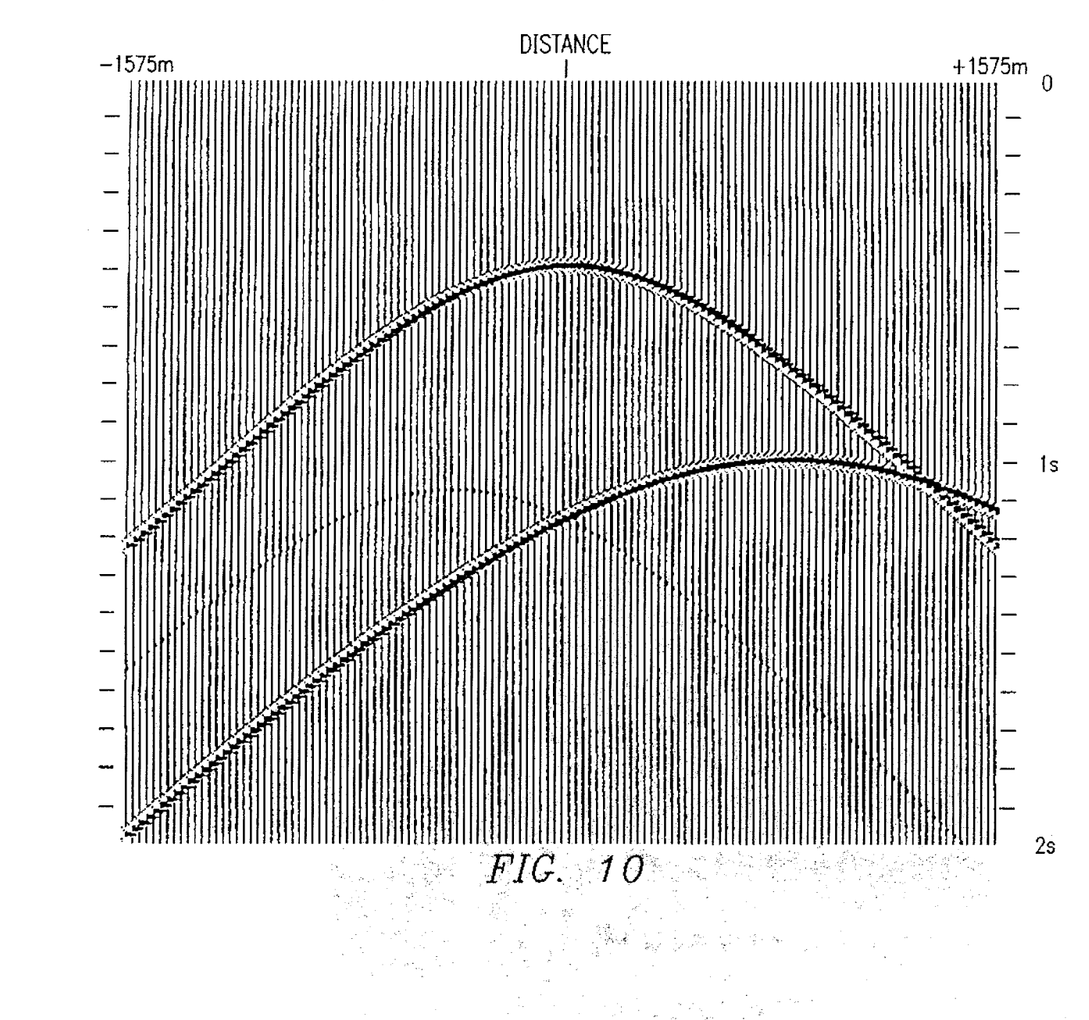
FIG. 10 displays a common source group of sample traces submitted as input to the invention.
Figure 11:
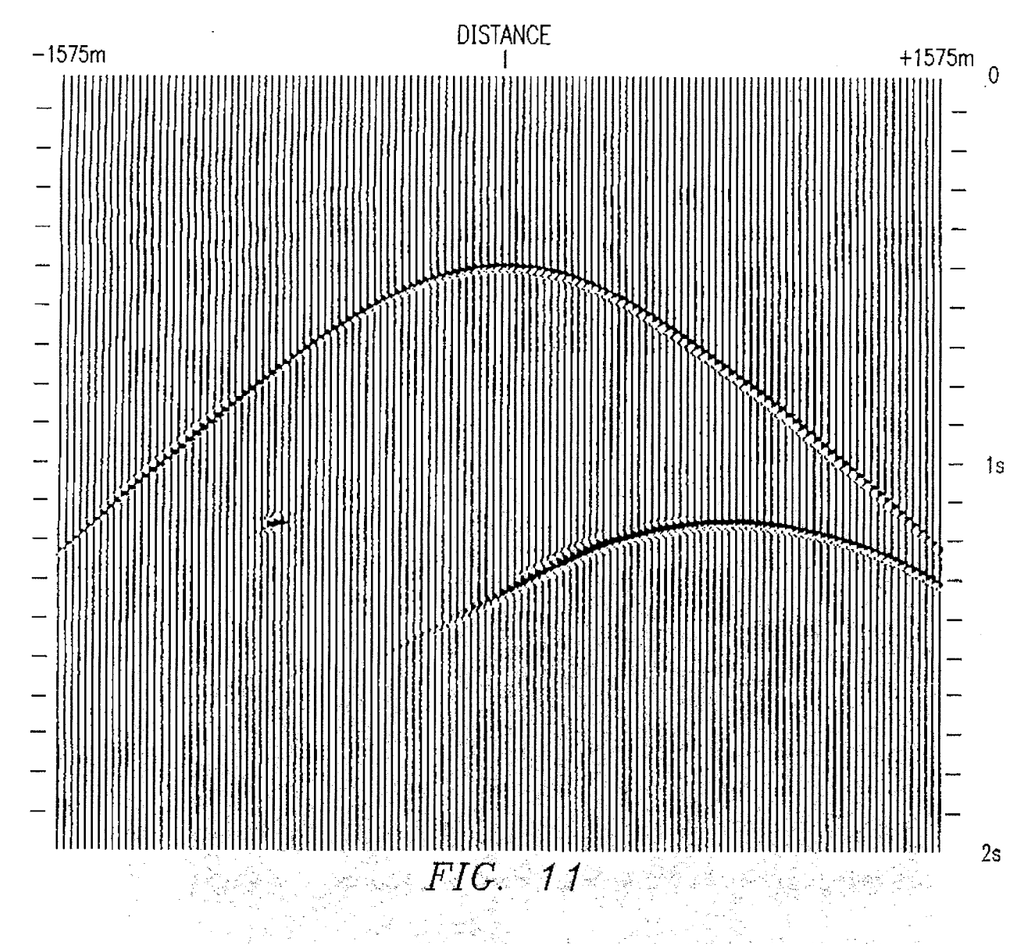
FIG. 11 displays the result after applying the invention to the input data of FIG. 10.
Figure 12:
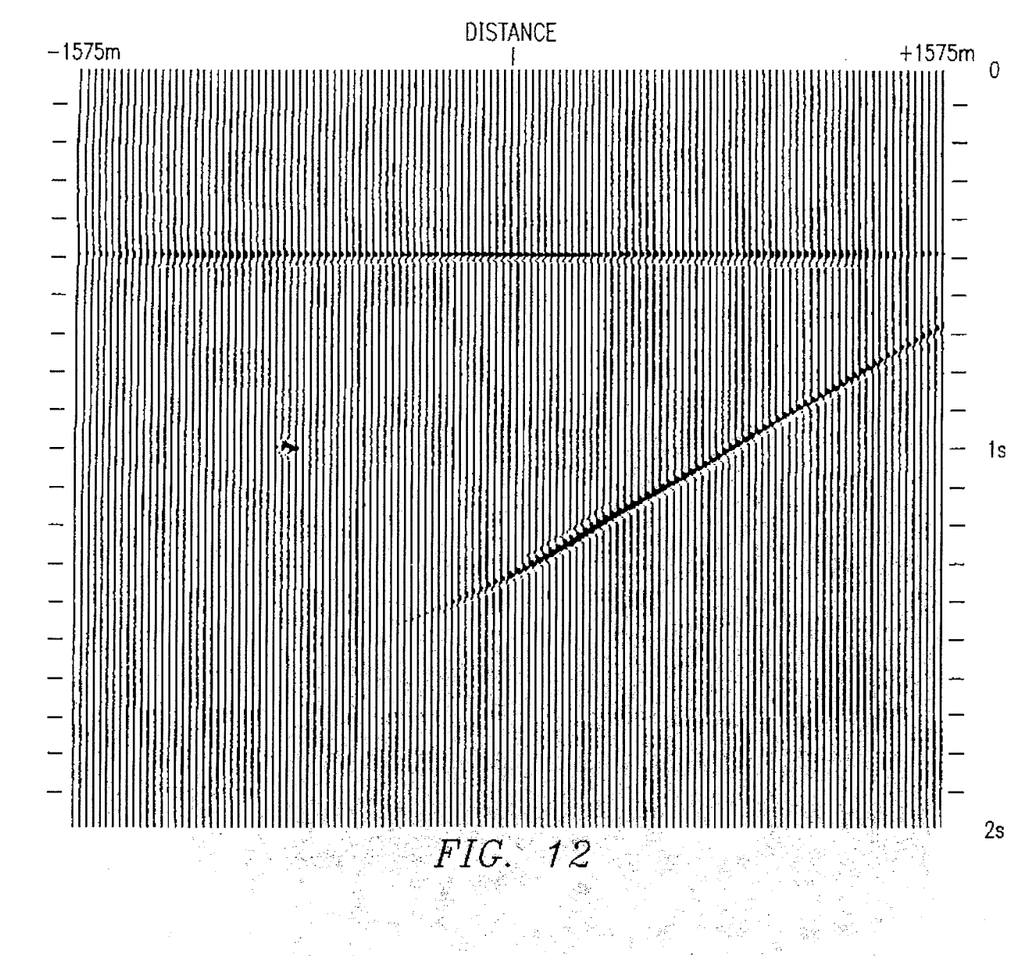
FIG. 12 displays the result after using a NMO correction on the results of FIG. 11.

FIGS. 10 through 12 exemplify the computer implementation of the invention for digitally sampled data, employing the same geometrical elements and numerical values as in FIGS. 6A through 9.

FIG. 10 displays a common source group of synthetic seismic traces submitted as input to the invention. The three curves observable in the display have the same interpretation as the three curves in FIG. 6B. The signal amplitude for the diffraction curve appears less than that of the reflections.

FIG. 11 displays the result of applying this invention to the input shown in FIG. 10 using the specific implementation defined in FIG. 5. The observable results coincide with the results shown in FIG. 9. Those skilled in the art will also recognize effects due to the finite lateral extent of the input data where the output for the dipping reflector is confined toward the right (or updip) side of the display. The "point" to which the diffractor collapses is expressed across several output traces because of finite lateral resolution.

FIG. 12 displays the result of applying to the data of FIG. 11 the standard process of NMO correction. By changing the display time of each sample to $t_O$ one has the following relationship:

$$t_0 = \sqrt{t^{2\prime} - \frac{4x^2}{v^2}} \tag{3}$$

For the special case of constant v, and for the numerical values employed in these examples, one can compare FIG. 12 directly with FIG. 7.

The method of the present invention properly positions all three elements of the earth model: the horizontal plane, the dipping plane, and the diffracting point. At the same, a practioner of the method of the present invention can quickly extract the lateral location of each feature without resorting to other and more time-consuming methods. The lack of information in FIG. 12 regarding the left half of the dipping plane correlates to the absence in FIG. 7 of ray paths reaching that part of the plane.

Figure 13:
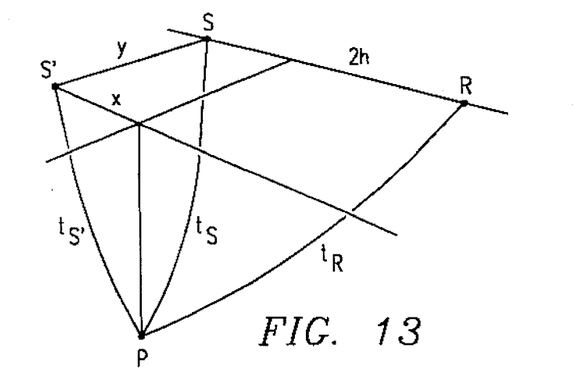
FIG. 13 depicts certain parameters involved when a third spatial dimension is explicitly taken into account during practice of the method of the present invention.

Obviously, numerous modifications and variations are possible in view of the teachings above. For example, the method of the present invention may be practiced so as to explicitly take into account the third spatial dimension. More specifically, referring to FIG. 13, it may be seen that the point P is displaced a distance y perpendicular to the vertical plane containing S and R, and it may also be seen that a point S' is displaced the same distance y from S perpendicular to SR in a horizontal plane. $t_{S'}$ is the travel time from P to S'. In such a case, the method of the present invention can include the step of repositioning the indication of a coherent signal observed at (h,t) within an input shot record to a new location (x,t') within a second, output, record that initially contains no information. Midpoint x, half-offset h, and $t = t_S + t_R$ are defined as before, but here two-way shot $t' = 2t_{S'}$. In the case of extreme variation of subsurface velocity, the best estimate of the true velocity may be employed in determining $t = t_S + t_R$. However, in determining t', it is permissible to presume a different, less variable model and to compute therefrom an alternative value of $t_{S'}$.

Figure 14:
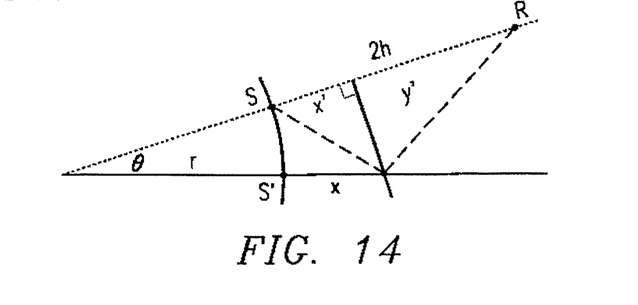
FIG. 14 depicts certain parameters involved when radial deployment of sources and receivers is explicitly taken into account during practice of the method of the present invention.

As another example, the method of the present invention may be practiced so as to relax any condition that neighboring shot records must have substantially parallel SR axes, referring instead to radial deployment of sources and receivers (see U.S. Pat. No. 4,803,668, incorporated herein by reference). In such a case, a plurality of shot records may be required, with the shot location of each lying a common distance r from a central point, and the SR axis of each substantially coincident with a radius extending from the central point. The polar angle $\Theta$ between two such radii would be the measure of displacement between the corresponding SR axes (see FIG. 14). This method of the present invention could include the steps of repositioning the indication of a coherent signal observed at (h,t) within an input shot record to a new location (x,t') within a second, output, record that initially contains no information. Further, for each of a plurality of radially aligned shot records, where $\Theta$ designates the displacement between an input record and a single output record, and for each pair of x and h values (x pertaining to the output record and h pertaining to the input record), and making any convenient and appropriate assumptions about the subsurface, this method of the present invention could also include the steps of computing related (i.e., corresponding) sets of values of $t_{S'}$, $t_S$, and $t_R$, together $$t' = 2t_S \text{ and } t = t_S + t_R,$$

such that the necessary ranges of t and t' are covered with sufficient density. Still further, this method of the present invention could also include the step of adding into each sample stored at (x, t') in the output record the sample stored at (h,t) in the input record, where t and t' are related as above. Other modifications and variations are possible. Accordingly, within the scope of the appended claims, the present invention may be practiced otherwise than as specifically described hereinabove.

What is claimed is:

1. A method of processing seismic data in a system having a spaced source and receiver, said method comprising the steps of:

acquiring at least one seismic common-source record, which at least one seismic common-source record exhibits received amplitude as a function of time t and half-offset h; and for said at least one seismic common-source record, repositioning the indication of a signal observed at (h,t) to a new location (x,t'), wherein there are a plurality of seismic common-source records, wherein each of said plurality of seismic common-source records has a signal, wherein each signal is coherent, and wherein said step of repositioning comprises the steps of:

for each pair of x and h values, determining related pairs of values $t_S$ and $t_R$, together with $t' = 2t_S$ and $t = t_S + t_R$; and adding into each sample stored at (x,t') in an output record the sample stored at (h,t) in an input record, where t and t' are related as above.

2. The method of claim 1, further comprising the step of making an assumption about the subsurface, and wherein a particular substrate condition is assumed such that $$t_S = [t_V^2 + (x/v)^2]^{1/2}, \text{ and}$$

$$t_R = [t_V^2 + (2h-x)^2/v^2]^{1/2},$$

where $t_V$ is an independent variable correlated with v, a variable having the dimension of velocity, whereby it may be stated that $$t = t'/2 + [t'^2 + 16h(h-x)/v^2]^{1/2}/2$$

so that given x, h, and t', t is fully determined.

3. The method of claim 2, wherein t' is determined by x, h, and t, to wit:

$$(t - t'/2)^2 = [t'^2 + 16h(h-x)/v^2]/4;$$

$$t^2 - tt' = 4h(h-x)/v^2;$$

$$t' = t + 4h(x-h)/(v^2 t);$$

or $$t' = t + (2h/v)(x-h)/(vt/2).$$

4. The method of claim 3, further comprising the steps of:

for each common-source record, creating an additional output record, initially containing no information, whose samples (h', $t_O$) correspond to discrete values of half-offset h' and time $t_O$; and for each pair of x and h' values, adding into each sample stored at (h', $t_D$) in the additional output record the sample stored at (x,t') in the first output record, wherein t' is determined from $t_D$ by $$t' = [t_D^2 + 4h'(2x - h')/v^2]^{1/2},$$

whereby demigration of the first output record and, equivalently, DMO of the input shot record is effectuated.

5. A method of processing seismic data in a system having a spaced source and receiver, said method comprising the steps of:

acquiring at least one seismic common-source record, which at least one seismic common-source record exhibits received amplitude as a function of time t and half-offset h;

for said at least one seismic common-source record, repositioning the indication of a signal observed at (h,t) to a new location (x,t');

applying to each sample (x,t') of each trace of each output common-source record an NMO correction whereby the sample at time t' is transposed to a new time $t_o$ defined by $$t_o = (t'^2 - 4x^2/vN_{NMO}^2)^{1/2}; \text{and}$$

where particular values of S+x and of $t_o$ are shared by more than one sample (S being the location of a particular source and x being the midpoint of that source and a particular receiver), summing together the amplitudes of all such samples (S+x, $t_o$) to create a new sample.

6. A method of processing seismic data in a system having a spaced source and receiver, said method comprising the steps of:

acquiring at least one seismic common-source record, which at least one seismic common-source record exhibits received amplitude as a function of time t and half-offset h; and for said at least one seismic common-source record, repositioning the indication of a signal observed at (h,t) to a new location (x,t'), wherein point P defines an undetermined object somewhere in the substrate; wherein said point P is displaced a distance y perpendicular to the vertical plane containing a source S and a receiver R; wherein a point S' is displaced the same distance y from S perpendicular to SR in a horizontal plane; wherein $t_S$, defines the travel time from P to S'; and further comprising the step of repositioning the indication of a coherent signal observed at (h,t) within an input shot record to a new location (x,t') within a second output, record that initially contains no information, where two-way shot time $t'=2t_{S'}$.

7. The method of claim 6, wherein said step of repositioning involves for each of a plurality of parallel aligned shot records, where y designates the distance from said input record to a single output record, and for each pair of x and h values (x pertaining to said output record and h pertaining to said input record), determining related Sets of values of $t_{S'}$, $t_S$, and $t_R$ together with $$t'=2t_{S'} \text{ and } t=t_S+t_R; \text{ and}$$

adding into each sample stored at (x, t') in the output record the sample stored at (h,t) in the input record, where t and t' are related as above.

8. The method of claim 6, further comprising the step of assuming a particular subsurface condition such that $$t_{S'}=[t_V^2+(x/v)^2]^{1/2},$$

$$t_S=[t_V^2+(x/v)^2+(y/v)^2]^{1/2}, \text{ and}$$

$$t_R=[t_V^2+(2h-x)^2/v^2+(y/v)^2]^{1/2},$$

where $t_V$ is an independent variable correlated with v, a variable having the dimension of velocity, whereby, since $t_{S'}=t'/2$ and $t=t_S+t_R$, the relationship between corresponding values of t and t' is $$t=t_m/2+[t_m^2+16h(h-x)/v^2]^{1/2}/2,$$

where $t_m=[t'^2+(2y/v)^2]^{1/2}$, so that given y,x,h, and t', t is fully determined.

9. The method of claim 8 wherein t' is determined by y,x,h, and t, to wit:

$$t'=[t_m^2-4y^2/v^2]^{1/2},$$

where $t_m=t+(2h/v)(x-h)/(vt/2)$.

10. A method of processing seismic data in a system having a spaced source and receiver, said method comprising the steps of:

acquiring at least one seismic common-source record, which at least one seismic common-source record exhibits received amplitude as a function of time t and half-offset h; and for said at least one seismic common-source record, repositioning the indication of a signal observed at (h,t) to a new location (x,t'), wherein a plurality of shot records are required, the shot location of each lying a common distance r from a central point, the SR axis of each substantially coincident with a radius extending from said central point, the polar angle Θ between two such radii being the measure of displacement between the two corresponding SR axes, and further comprising the steps of repositioning the indication of a coherent signal observed at (h,t) within an input shot record to a new location (x, t') within a second, output, record that initially contains no information, and, for each of a plurality of radially aligned shot records, where Θ designates the displacement between said input record and said single output record, and for each pair of x and h values (x pertaining to said output record and h pertaining to said input record), computing related sets of values $t_{S'}$, $t_S$, and $t_R$, together with $$t'=2t_{S'} \text{ and } t=t_S+t_R, \text{ and}$$

adding into each sample stored at (x,t') in the output record the sample stored at (h,t) in said input record, where t and t' are related as above.

11. The method of claim 10, further comprising the step of assuming a particular substrate condition such that $$t_{S'}=[t_V^2+(x/v)^2]^{1/2},$$

$$t_S=[t_V^2+(x/v)^2+(y/v)^2]^{1/2}, \text{ and}$$

$$t_R=[t_V^2+(2h-x)^2/v^2+(y/v)^2]^{1/2},$$

where $$x'=x \cos \Theta - r(1-\cos \Theta), \text{ and}$$

$$y'=(r+x)\sin \Theta,$$

whereby $$t_R^2=t_S^2+4h(h-x')/v^2, \text{ and}$$

whereby the relationship between corresponding values of t and t' is $$t=t_m/2+[t_m^2+16h(h-x')/v^2]^{1/2}/2,$$

where $$m=[t'^2+(2y'/v)^2]^{1/2},$$

so that given r, Θ, x, h, and t', t is fully determined.

12. The method of claim 11, wherein t' is determined by r, Θ, x, h, and t, to wit:

$$t'=[t_m^2-4y^2/v^2]^{1/2}, \text{ where}$$

$$t_m=t+(2h/v)(x'-h)/(vt/2).$$

13. A method of seismic shot-record migration comprising the steps of:

generating acoustic waves into an earth formation from a plurality of spaced sources;

receiving reflection, refraction, and diffraction signals of said acoustic waves at a plurality of spaced receivers to form a common-shot set of seismic input traces, said seismic input traces being digitally sampled functions of time t of said received signal;

arbitrarily selecting a source location from said plurality of spaced sources and selecting a receiver location from said plurality of spaced receivers, said source location and said receiver location being separated by a particular distance 2h;

defining a common-shot set of output traces wherein each said output trace is initialized to zero, said output traces representing a function of time t' at a particular distance 2x from said source location to a hypothetical receiver; and mapping at least one seismic input trace (h,t) for $$t > \frac{2|h|}{v},$$

to a plurality of output samples (x,t') for $$|x - h| < \frac{vt}{2}$$

to produce output data using the relationship:

$$t' = t + \frac{\left(\frac{2h}{v}\right)(x-h)}{\left(\frac{vt}{2}\right)} \quad (1)$$

where v = velocity of an acoustic wave through an earth formation,

2h = distance between the source location and the receiver location,

2x = distance between the source location and a hypothetical receiver, t = travel time of an acoustic wave from the source location to the receiver location by way of a reflection at an undetermined subsurface point, and t' = travel time of an acoustic wave from the source location to a hypothetical receiver location by way of a reflection at the undetermined subsurface point.

14. The method of claim 13 further comprising the step of applying NMO correction to said output data.

15. A method of seismic shot-record migration, comprising the steps of:

generating acoustic waves into an earth formation from a plurality of spaced sources;

receiving reflection, refraction, and diffraction signals of said acoustic waves at a plurality of spaced receivers to form a common shot set of seismic input traces, said seismic input traces being digitally sampled functions of time t of said received signal;

arbitrarily selecting a source location from said plurality of spaced sources and selecting a receiver location from said plurality of spaced receivers, said source location and said receiver location being separated by a particular distance 2h;

defining a common-shot set of output traces wherein each said output trace is initialized to zero, said output traces representing a function of time t' at a particular distance 2x from said source location to a hypothetical receiver; and mapping a plurality of seismic input traces (h,t) for $$|x - h| < \frac{vt}{2},$$

to at least one output sample (x,t') for $$t' > \frac{2|x|}{v}$$

to produce output data using the relationship:

$$t = \frac{t' + \sqrt{t'^2 - \frac{16h(x-h)}{v^2}}}{2} \quad (2)$$

where v = velocity of an acoustic wave through an earth formation,

2h = distance between the source location and the receiver location,

2x = distance between the source location and a hypothetical receiver, t = travel time of an acoustic wave from the source location to the receiver location by way of a reflection at an undetermined subsurface point, and t' = travel time of an acoustic wave from the source location to a hypothetical receiver location by way of a reflection at the undetermined subsurface point.

16. The method of claim 15 further comprising the step of applying NMO correction to said output data.

\* \* \* \* \*